F. C. DENHAM.
BRAKE LEVER.
APPLICATION FILED AUG. 22, 1921.

1,416,338.

Patented May 16, 1922.

INVENTOR
FREDERICK CHARLES DENHAM
PER Rayner & Co
ATTORNEYS

UNITED STATES PATENT OFFICE.

FREDERICK CHARLES DENHAM, OF WELLINGTON, ENGLAND, ASSIGNOR OF ONE-HALF TO ALAN FRANCIS DAVEY, OF TAUNTON, ENGLAND.

BRAKE LEVER.

1,416,338.        Specification of Letters Patent.    Patented May 16, 1922.

Application filed August 22, 1921. Serial No. 494,404.

(GRANTED UNDER THE PROVISIONS OF THE ACT OF MARCH 3, 1921, 41 STAT. L., 1313.)

*To all whom it may concern:*

Be it known that I, FREDERICK CHARLES DENHAM, of 27 High Street, Wellington, in the county of Somerset, England, a subject of the King of Great Britain and Ireland, have invented a new and useful Improvement in Brake Levers, (for which I have filed an application in England, June 28, 1919, Patent No. 145,979,) of which the following is a specification.

My invention relates to levers for operating the brakes of motor and the like vehicles and comprises means for holding the brake in the "on" position and it is especially intended to be applied to foot brakes.

According to my invention I employ a rack formed on or attached to the brake-lever itself and adapted to slide in a more or less vertical direction when the brake pedal is actuated. To some fixed portion of the chassis or to the floor or foot-boards is hinged a pawl, which is adapted to engage with the teeth of the rack on the brake lever or pedal, when this is operated and thus hold this in the operative position.

The pawl is hinged to the chassis of the vehicle or to the floor or foot-boards and is adapted to be readily turned out of engagement with the rack so as to release the lever and allow the brake to come out of action. The pawl may be provided with a suitable projection or pedal by means of which it may be readily operated by the foot to throw it into the "engaged" or "free" position at will.

It is intended that the pawl should normally be in the "free" position so that the brake may be readily applied and will automatically come out of action when released, during ordinary driving. This applies particularly to motor car foot brakes which are frequently in use for very short periods during ordinary driving. The pawl may, however, be at once thrown into engagement when it is desired to use the foot brake for holding the car stationary on a hill or when it is desired to hold the brake "on" for long periods.

The rack or ratchet teeth may be formed directly on the shank of the brake lever or they may be attached to the lever by means of suitable clamps or the rack may be stamped in sheet metal and clamped round the shank of the lever.

In order that my invention may be more clearly understood reference is made to the accompanying sheet of illustrative drawings in which:—

Figure 1:
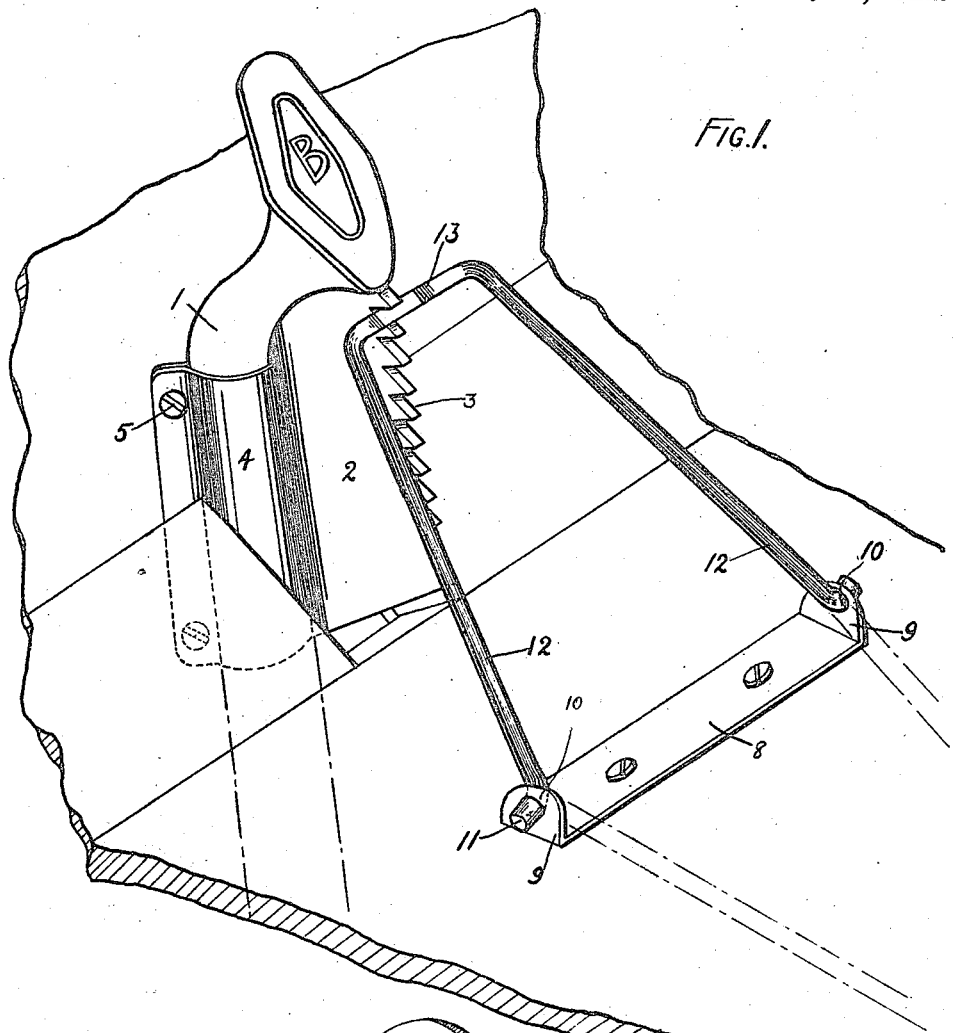
Fig. 1 is a perspective view of a suitable construction of my invention wherein a rack is adapted to be attached to the existing brake pedal.
Figure 2:
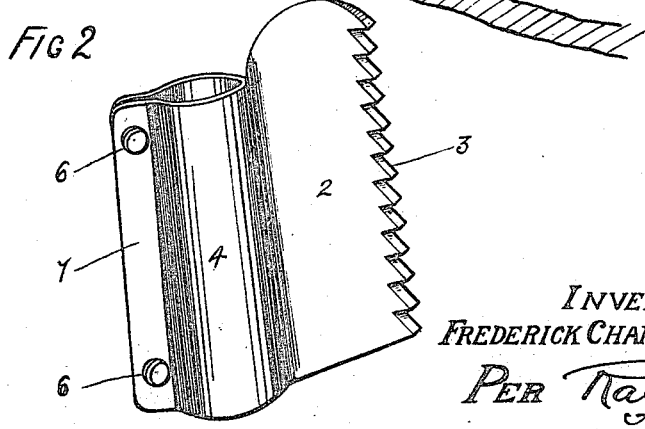
Fig. 2 is a perspective view of the rack.

Referring to the drawings the brake pedal 1 is provided with a rack 2 having teeth 3 and adapted to be clamped upon the shank of the brake pedal 1 by means of the clip 4, which embraces the shank of the brake pedal and may be clamped thereon by means of the screws 5 passing through holes 6 in the two edges 7 of the clip 4.

Mounted upon the floor or foot-board of the car is a bracket 8, having upturned ends 9 in which are provided holes 10 which form bearings for the reception of the ends 11 of a bent U shaped metal rod 12. This U shaped metal rod 12 acts as a pawl, the cross-bar 13 at its upper end engaging in the teeth 3 on the rack 2.

In Fig. 1 the brake pedal 1 is shewn in the "off" position and the cross-bar 13 of the pawl 12 engages in the upper end of the rack 2. If the pedal be now depressed it will recede from the pawl 12 and carry the rack 2 with it, thus allowing the pawl 12 to swing about its ends 11 as a pivot so that the cross-bar 13 will be lowered and will engage in some other teeth lower down on the rack 2 so as to hold the brake lever 1 in the "on" position when required.

By merely disengaging the cross-bar 13 of the pawl 12 from the ratchet teeth 3 on the rack 2 the brake lever will be allowed to return to its original position, allowing the brake to be disengaged. When the device is not required to be in operation the pawl 12 is turned about its ends 11 pivoted in the bracket 8 so that it will lie flat upon the foot-board of the car as shewn in dotted lines.

When a mat or other covering is employed upon the foot-board of the car, the pawl 12 may be readily detached from the bracket 8 by pressing together the two limbs so as to withdraw the ends 11 from the holes 10 in the upturned ends 9 of the bracket 8, and slots may be provided in the mat through which the upturned ends 9 project.

When the device is not required to be in use the pawl 12 may be readily removed as described above and placed in a locker or other convenient position. Normally the pawl 12 lies flat upon the foot-board of the car as shewn in the dotted lines, but when it is desired to apply the foot-brake for long periods or to hold the same in engagement so as to retain the car stationary on a hill, the pawl is turned up so that its end 13 will engage with the teeth 3 on the rack 2 as illustrated in Fig. 1, and when in this position it will operate to hold the brake pedal in the "on" position when the latter is depressed to apply the brake.

I claim:—

1. In brake levers for motor vehicles, a toothed rack upon the brake lever, a bracket mounted on the foot-board of the car, a pawl pivoted in this bracket, a transverse bar at the operative end of the pawl adapted to engage with the teeth of the rack to hold the brake lever in the "on" position, the pawl being adapted to be turned out of engagement when not required.

2. In brake levers for motor vehicles, a toothed rack, a clip upon this rack adapted to embrace the brake lever, means for securing this clip around the brake lever so as to clamp the rack in position, a bracket mounted on the foot-board of the car, a pawl pivoted in this bracket, a transverse bar at the operative end of the pawl adapted to engage with the teeth of the rack to hold the brake lever in the "on" position, the pawl being adapted to be turned out of engagement when not required.

3. In brake levers for motor vehicles a toothed rack upon the brake lever, a bracket mounted on the foot-board of the car, a pawl comprising a U shaped metal rod having bent ends pivoted in this bracket, a transverse bar at the operative end of the pawl adapted to engage with the teeth of the rack to hold the brake lever in the on position, the pawl being adapted to be turned out of engagement when not required.

4. In brake levers for motor vehicles, a toothed rack, a clip upon this rack adapted to embrace the brake lever, means for securing this clip around the brake lever so as to clamp the rack in position, a bracket mounted on the foot-board of the car, a pawl comprising a U shaped metal rod having bent ends, pivoted in this bracket, a transverse bar at the operative end of the pawl adapted to engage with the teeth of the rack to hold the brake lever in the "on" position, the pawl being adapted to be turned out of engagement when not required.

5. In brake levers for motor vehicles, a toothed rack upon the brake lever, a flat metal plate, pierced upturned ends to this metal plate forming a bracket mounted on the foot-board of the car, a pawl pivoted in this bracket, a transverse bar at the operative end of the pawl adapted to engage with the teeth of the rack to hold the brake lever in the "on" position, the pawl being adapted to be turned out of engagement when not required.

6. In brake levers for motor vehicles, a toothed rack, a clip upon this rack adapted to embrace the brake lever, means for securing this clip around the brake lever so as to clamp the rack in position, a flat metal plate, pierced upturned ends to this metal plate forming a bracket mounted on the foot-board of the car, a pawl pivoted in this bracket, a transverse bar at the operative end of the pawl adapted to engage with the teeth of the rack to hold the brake lever in the "on" position, the pawl being adapted to be turned out of engagement when not required.

7. In brake levers for motor vehicles, a toothed rack upon the brake lever, a flat metal plate, pierced upturned ends to this metal plate forming a bracket mounted on the foot-board of the car, a pawl comprising a U shaped metal rod having bent ends pivoted in this bracket, a transverse bar at the operative end of the pawl adapted to engage with the teeth of the rack to hold the brake lever in the "on" position, the pawl being adapted to be turned out of engagement when not required.

8. In brake levers for motor vehicles, a toothed rack, a clip upon this rack adapted to embrace the brake lever, means for securing this clip around the brake lever so as to clamp the rack in position, a flat metal plate, pierced upturned ends to this metal plate forming a bracket mounted on the foot-board of the car, a pawl comprising a U shaped metal rod having bent ends, pivoted in this bracket, a transverse bar at the operative end of the pawl adapted to engage with the teeth of the rack to hold the brake lever in the "on" position, the pawl being adapted to be turned out of engagement when not required.

FREDERICK CHARLES DENHAM.